United States Patent
Scott et al.

(10) Patent No.: US 12,137,708 B2
(45) Date of Patent: *Nov. 12, 2024

(54) MODIFICATION OF FEED CONSUMPTION PATTERNS IN BEEF CATTLE RATIONS

(71) Applicant: Purina Animal Nutrition LLC, Arden Hills, MN (US)

(72) Inventors: Ronald Ray Scott, St. Charles, MO (US); James Christopher Forcherio, Pacific, MO (US)

(73) Assignee: Purina Animal Nutrition LLC, Arden Hills, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 18/332,182

(22) Filed: Jun. 9, 2023

(65) Prior Publication Data

US 2023/0380455 A1    Nov. 30, 2023

Related U.S. Application Data

(60) Continuation of application No. 17/686,830, filed on Mar. 4, 2022, now Pat. No. 11,712,051, which is a continuation of application No. 16/430,973, filed on Jun. 4, 2019, now Pat. No. 11,311,030, which is a division of application No. 13/049,451, filed on Mar. 16, 2011, now Pat. No. 10,349,667.

(60) Provisional application No. 61/315,077, filed on Mar. 18, 2010, provisional application No. 61/314,882, filed on Mar. 17, 2010.

(51) Int. Cl.
| | |
|---|---|
| A23K 50/10 | (2016.01) |
| A23K 20/158 | (2016.01) |
| A23K 20/24 | (2016.01) |
| A23K 20/26 | (2016.01) |

(52) U.S. Cl.
CPC ............ *A23K 50/10* (2016.05); *A23K 20/158* (2016.05); *A23K 20/24* (2016.05); *A23K 20/26* (2016.05)

(58) Field of Classification Search
CPC ........ A23K 50/10; A23K 50/00; A23K 40/35; A23K 50/15; A23K 10/00
See application file for complete search history.

(56) References Cited

U.S. PATENT DOCUMENTS

| | | | |
|---|---|---|---|
| 3,956,482 | A | 5/1976 | Hahn et al. |
| 4,182,755 | A | 1/1980 | McNeff |
| 4,333,956 | A | 6/1982 | Juengst et al. |
| 4,900,562 | A | 2/1990 | Miller |
| 5,160,753 | A | 11/1992 | Van Benthem et al. |
| 5,169,656 | A | 12/1992 | Williams et al. |
| 5,378,477 | A | 1/1995 | Williams et al. |
| 5,686,125 | A | 11/1997 | Mueller |
| 10,349,667 | B2 | 7/2019 | Scott et al. |
| 11,311,030 | B2* | 4/2022 | Scott .................... A23K 20/158 |
| 11,712,051 | B2* | 8/2023 | Scott ...................... A23K 50/10 |
| | | | 426/442 |
| 2008/0089998 | A1 | 4/2008 | Chou |
| 2019/0281863 | A1 | 9/2019 | Scott et al. |
| 2022/0183325 | A1 | 6/2022 | Scott et al. |

FOREIGN PATENT DOCUMENTS

KR    20090121758 A    11/2009

OTHER PUBLICATIONS

"Steer", Britannica Online Encyclopedia, retrieved on Sep. 28, 2022, retrieved from http:/www.britannica.com/print/article/564800.
Blezinger, Steve B., "Cattle Today: Creep Feeding—Taking Another Look", Online www.cattletoday.com/achive/2000/July/Cattle_Today97.shtml, Aug. 1, 2000, pp. 1-6.
Jensen, Jerry Edward, "Restricting intake of energy supplements fed to yearling steers grazing irrigated pasture", A Thesis Presented to the Faculty of The Graduate College in the University of Nebraska in Partial Fulfillment of Requirements For the Degree of Master of Science, Mar. 1979, pp. 1-99.
PCT , "International Search Report and Written Opinion", Application No. PCT/US2011/028837, Dec. 29, 2011, 6 pages.

* cited by examiner

*Primary Examiner* — Hong T Yoo
(74) *Attorney, Agent, or Firm* — Dorsey & Whitney LLP

(57) ABSTRACT

The present invention relates to feed compositions that can modify the feeding behavior of animals. Supplements can be added to no or low roughage rations that improve the performance of animals. In particular, the addition of calcium chloride to a low or no roughage ration can increase the number of feedings but decrease the amount of feeding per meal. This can result in promoting enhances feed conversion and better cost of feed to weight gain.

20 Claims, No Drawings

MODIFICATION OF FEED CONSUMPTION PATTERNS IN BEEF CATTLE RATIONS

CROSS-REFERENCE TO RELATED APPLICATION

The present application is a continuation of U.S. patent application Ser. No. 17/686,830, filed Mar. 4, 2022, now U.S. Pat. No. 11,712,051, which is a continuation of U.S. patent application Ser. No. 16/430,973, filed Jun. 4, 2019, now U.S. Pat. No. 11,311,030, which is a divisional of U.S. patent application Ser. No. 13/049,451, filed Mar. 16, 2011, now U.S. Pat. No. 10,349,667, which is based on and claims the benefit of U.S. provisional patent application Ser. No. 61/314,882, filed Mar. 17, 2010 and U.S. provisional patent application Ser. No. 61/315,077, filed Mar. 18, 2010, the contents of which are hereby incorporated by reference in their entirety.

FIELD OF THE INVENTION

The present invention relates to feed compositions that modify the feeding behavior of animals, and in particular, it relates to supplements which are added to no roughage or low roughage feeds where the supplements improve feed conversion and improve the cost of feed to weight gain when fed in an ad libitum environment. The present invention also relates to a method for modifying the feed intake of animals, and in particular cattle, by feeding a feed composition including calcium chloride.

BACKGROUND OF THE INVENTION

Ruminant animals, such as beef cattle, are classified as herbivores, meaning they can survive and produce while feeding chiefly on grass or other roughage feed ingredients consisting of large amounts of cellulose. However, cattle which are being produced for slaughter will normally be placed in a confined feeding facility (feedlot) at 7-15 months of age, and fed growing diets consisting of 30-60% roughage and/or finishing diets consisting of only 5-15% roughage (conventional finishing ration), the roughage will normally be in the form of hay, silage, fodder, corn cobs, cottonseed hulls, etc. The remainder of the diet will consist of a high energy grain source such as corn, grain sorghum, barley, wheat, grain by-products, etc., and properly balanced for protein, minerals and vitamins. The roughage ingredients promote average daily gain, by aiding the reduction of incidences of digestive disorders such as loose stools, acidosis, bloat and flounder.

Including 5-15% roughage in the diet of finishing cattle tends to lessen the variation in day-to-day feed intake compared to cattle receiving feed containing no roughage. In addition, roughage in high grain diets stimulates the flow of saliva, which helps buffer the acids produced during fermentation which helps to maintain intake. Although roughage aids in maintaining intake by reducing digestive upsets, the resulting concentration of energy in the diet is reduced. When attempts are made to feed ruminants diets containing no roughage or low amounts of roughage, animal performance is reduced and metabolic problems normally occur. Feed intake of cattle receiving no roughage or low roughage diets becomes very erratic, and the amount of buffering capability through salivation is reduced which leads to rumen malfunction problems.

Without intake behavior modification, normally cattle will tend to consume more of the no roughage or low roughage diet at each feeding and reduce the number of meals each day when compared to a diet with a typical amount of roughage. This erratic intake of all grain (no roughage or low roughage) diets, even though properly balanced for protein and minerals, can result in starch overload which can cause adverse effects to the cattle as well as the profitability of the feedlot. Some adverse effects to profitability include a poorer efficiency of the feed conversion and an increase in the cost to gain ratio.

SUMMARY OF THE INVENTION

The present invention includes a feed supplement for animal consumption that contains a feeding pattern modifying composition. The feeding pattern modifying composition includes calcium chloride by itself or in combination with fish oil, diammonium phosphate, ammonium sulfate, or any combination thereof, where the amount of calcium chloride is in an amount effective to modify the feeding pattern of ruminants, such as cattle. The modified feeding pattern allows the performance of the cattle consuming the low roughage or no roughage diet to be similar or superior to that of cattle consuming a feed with a typical weight percent of roughage. The present invention also includes a method of using the feed supplement containing the feeding pattern modifying composition described above for animals.

In a first aspect, the present invention relates to a feed composition for an animal. The feed composition includes a feed having less than 5 weight percent roughage of the total feed on a dry basis and calcium chloride in an amount effective to modify the feeding behavior of the animal such that the animal feeds more times per day and consumes less feed per feeding than compared to an animal fed a conventional ration.

In another aspect, the present invention also relates a method of feeding an animal. The method includes feeding the animal a feed composition comprising roughage between about 0 percent by weight and about 5 percent by weight and calcium chloride between about 0.15 weight percent and about 0.40 weight percent on a dry matter basis wherein the feeding results in more frequent feedings and less intake per feeding compared to a conventional ration.

In a further aspect, the present invention also relates to a method of modifying the feeding pattern of an animal. The method includes adding calcium chloride to a feed having less than about 5 percent by weight in roughage, the calcium chloride in an amount sufficient to modify the feeding behavior of the animal such that the animal feeds more times per day and consumes less feed per feeding than compared to an animal fed conventional ration.

DETAILED DESCRIPTION

The present invention includes a feed supplement containing a feeding pattern modifying composition for adding to a no roughage or low roughage feed composition. The feeding pattern modifying composition includes calcium chloride ($CaCl_2$) that is present in an amount which is effective in modifying the feeding patterns of animals, such as cattle, that are being fed the no roughage or low roughage diet in an ad libitum environment. The modified feeding patterns enable the cattle to gain a similar amount of weight while consuming the no roughage or low roughage feed when compared to cattle fed a typical roughage diet, i.e. of about 8-10 weight percent on a dry matter basis. The feed supplement with the feeding pattern modifying composition is particularly useful in feeding cattle contained in a feedlot where the no roughage or low roughage feed is continually available to the animal.

By an ad libitum environment is meant that feed is placed in a feeder or other suitable container and the animal eats until it is satisfied where the no roughage or low roughage feed is always available to the animal for consumption at the animal's free will. What is meant by a no roughage or a low roughage feed is a feed containing roughage in the range of about 0.0 weight percent and about 5.0 weight percent on a dry matter basis.

What is meant by a feeding pattern modifying composition is a composition that changes the frequency of feedings and amount of feed consumed at each feeding. It has been determined that the feeding pattern modifying composition increases the number of feedings each day while reducing the amount of feed consumed at each feeding. This change includes an increase in night time feedings.

The feeding pattern modification that includes more frequent feedings while consuming less feed per feeding is especially useful in increasing the performance of cattle being fed a no roughage or low roughage diet. Because the no roughage or low roughage feed is being consumed at a more consistent rate, the incidences of digestive disorders are reduced. The results of the feeding pattern modifications include improved feed conversion and lowered cost to gain ratios when feeding a no roughage or low roughage feed. The improved performance results in greater profit potential.

Generally, the feeding pattern is modified by the low roughage ration with the calcium chloride when compared to a conventional ration having about 8% roughage. When the low roughage, feeding pattern modifying composition is used, the frequency of feedings can increase for example, by at least about 5 percent and preferably more than by about 10 percent. The amount of feed consumed in a meal (intake lbs/meal) can be decreased by at least about 10 percent and preferably by 20 percent compared to a conventional ration. The amount of feed consumed per day (intake pounds/day) can decrease by about 15 percent or less. The amount of the decrease in feed consumed per day is dependent on the level of roughage in the conventional diet.

In some exemplary embodiments, the frequency of feedings can be greater than 8 feedings per day. The amount of feed consumed in a meal (intake lbs/meal) can be less than 3 lbs/meal and preferably less than 2.5 lbs/meal. The amount of feed consumed per day (intake pounds/day) can be less than 20 lbs/day.

Generally cattle fed a no roughage or a low roughage feed reduce the number of feedings per day while increasing the amount of feed consumed per each feeding. Digestion is impaired and less total energy is consumed, causing a reduction in daily weight gain. The effect of the typical cattle feeding behavior is that the feed conversion is poorer, the cost to gain ratio is increased and the incidences of digestive disorders is increased. Each of these effects negatively affects the profit potential.

The feed supplement containing the feeding pattern modifying composition includes calcium chloride, typically in the range of about 0.15 weight percent to about 0.40 weight percent of the no roughage or low roughage feed on a dry matter basis. A typical weight percent of calcium chloride is about 0.25 weight percent of the feed on a dry matter basis. It has been found that utilizing calcium chloride in the range of about 0.15 weight percent to about 0.40 weight percent of the feed modifies the feeding behavior of cattle such that the gain achieved utilizing a no roughage or low roughage feed is similar to or exceeds the gain of cattle that consume a feed with a typical amount of roughage, for example, 8-10% roughage.

The feeding pattern modifying composition can optionally include fish oil, diammonium phosphate, ammonium sulfate, or any combination thereof where calcium chloride can be used in addition to or can replace any or all of the three additional ingredients. The amount of fish oil in the feed can optionally range from 0.0 weight percent to about 0.5 weight percent of the feed on a dry basis. The amount of diammonium phosphate can optionally range from 0.0 weight percent to about 0.25 weight percent of the feed on a dry basis. The amount of ammonium sulfate can optionally range from 0.0 weight percent to about 0.45 weight percent of the feed on a dry basis.

Calcium chloride can be less expensive than each of the fish oil, diammonium phosphate or ammonium sulfate. Calcium chloride can be included with the combination of the fish oil, diammonium phosphate or ammonium sulfate or utilized as a replacement for any or all of the fish oil, diammonium phosphate or ammonium sulfate to reduce the price of feed ingredients. The reduction in the price of the feeding pattern modifying composition reduces the costs of the feed and, in turn, increases the profit potential.

The feed supplement containing the feeding pattern modifying composition is mixed m any convenient manner which ensures uniform distribution of the feed supplement into the no roughage or low roughage feed. The feed is fed in any form which is suitable for feeding the animals. The feed supplement can optionally be in a liquid, pelletized or be in meal form. Once mixed, the feeding pattern modifying composition including calcium chloride will remain well distributed throughout the feed.

A typical manner of feeding the no roughage or low roughage feed containing the feeding pattern modifying composition that is substantially uniformly mixed into the feed is in an ad libitum manner where a continuous supply of feed is available such that the animal is free to eat as much feed as desired. The feeding pattern modifying composition is not intended to be utilized to limit the amount of feed consumed. Rather the feeding pattern modifying composition is utilized to modify the pattern that cattle feed on a no roughage or low roughage feed where the amount of consumed feed is at the optimal rate by increasing the frequency of the feedings while reducing the amount of feed consumed per feeding. It has been found that cattle consuming the no roughage or low roughage feed with the feeding pattern modifying composition are typically self limiting on the amount of feed consumed based on caloric intake.

The present invention also includes a method of feeding an animal a feed composition with low or no roughage. The feed composition having no or low roughage can be supplemented with calcium chloride. Preferably, the feed composition is supplemented with calcium chloride having a concentration between about 0.15% and about 0.40 percent by weight on a dry matter basis. In addition to the calcium chloride, the feed composition may be optionally supplemented with fish oil, ammonium sulfate, diammonium phosphate or combinations thereof at concentrations described herein.

The present invention also includes a method of modifying the feeding pattern of an animal. The animal can be any ruminant. Preferably, the animals are cattle. The method can include adding supplements to the feed compositions. Preferably, the supplements can include the calcium chloride that is added to the feed composition as described herein. The supplements can also include fish oil, ammonium sulfate and diammonium phosphate. The use of the supplement calcium chloride in the feed composition results in less intake by the animal in a given feeding but can also result in increased feedings in a day. This modification in feeding pattern can result in better performance. The feed to gain ratio can be advantageously improved.

The manner in which the feed containing the feeding pattern modifying composition of the present invention fed to the animals is not intended to be limited. Any manner suitable for feeding animals is satisfactory.

EXAMPLES

Example 1-Addition of Calcium Chloride in a Ration 64 steers were evaluated and the average weight of the steers was about 720 pounds. A low roughage (LR) ration has a 2% by weight roughage and can be modified with different supplement as indicated. In this example, the LR ration was supplemented with 0.39% Ammonium Sulfate (AS) and 0.42% Fish oil (FO). (LR-A) The effect of different amounts of $CaCl_2$ added to LR-A were evaluated. The concentrations of $CaCl_2$ used were 0.31%, 0.62% and 0.92% on a dry matter basis. Calcium chloride was a hand-add as the rations were being mixed each day. The results of this study are shown in Table 1.

In Tables 1-8, the abbreviations are as follows: ADG is average daily gain; MBI is a scoring system giving relative differences of loose stools (lower MBI Score is desirable); IWT is initial weight; FWT is final weight; DMI is dry matter intake.

The presence of the same subscripts, next to numbers in a row of data, indicate data that are statistically similar. The presence of different subscripts, next to numbers in a row of data, indicate data that are statistically different.

Feed efficiency or feed conversion was calculated by dividing feed intake by average daily gain. This relates to the pounds of feed required to achieve one pound of weight gain. A lower number is desirable.

TABLE 1

| Calcium Chloride | 0%(LR-A) | .31% | 62% | .92% |
| --- | --- | --- | --- | --- |
| Initial Weight | 719 | 721 | 713 | 722 |
| 2 Week Weight | 789 | 777 | 778 | 776 |
| 9 Week Weight | 1009 c | 990bc | 976 ab | 961 a |
| ADG0-2 Week | 4.68 | 3.89 | 3.94 | 3.79 |
| ADG2-9 Week | 4.59c | 4.44bc | 4.13ab | 3.87a |
| ADG0-9 Week | 4.61c | 4.3lbc | 4.08ab | 3.85a |
| F/H/D 0-2 Week | 22.5 | 21.3 | 21.2 | 21.3 |
| F/H/D 2-9 Week | 21.6c | 21.0bc | 19.8b | 18.0a |
| F/H/D 0-9 Week | 21.8c | 21.1bc | 20.1ab | 18.8a |
| #Feed/#Gain 0-2 Week | 5.21 | 6.16 | 5.54 | 6.39 |
| #Feed/#Gain 2-9 Week | 4.78 | 4.74 | 4.85 | 4.70 |
| #Feed/#Gain 0-9 Week | 4.78 | 4.95 | 4.96 | 4.93 |

TABLE 1-continued

| Calcium Chloride | 0%(LR-A) | .31% | 62% | .92% |
| --- | --- | --- | --- | --- |
| MBI Transition | 0.375 | 0.438 | 0.563 | 0.312 |
| MBI Finisher | 6.38 | 6.06 | 6.19 | 3.25 |
| MBI Total | 6.75 | 6.50 | 6.75 | 3.56 |

When the ration includes fish oil, the use of more than 0.62% of $CaCl_2$ in the ration reduced the intake and performance compared to rations with 0.31% or less of $CaCl_2$.

Example 2-Effect of Different Levels of Fish Oil with Rations Having 0.38% $CaCl_2$ 64 steers were evaluated with the average steer weight of 1020 pounds. The LR ration was supplemented with the addition of 0.39% AS and 0.38% $CaCl_2$ (LR-B). Different amounts of fish oil were added to LR-B. The amounts of fish oil evaluated were 0.42%, 0.31%, 0.21% and 0.1% fish oil on a dry matter basis. The results from this study are shown in Table 2. All of the rations shown in Table 2 contain 0.39% AS and 0.38% $CaCl_2$. The indicated amount of fish oil was added to LR-B.

TABLE 2

| | Level of Fish Oil | | | |
| --- | --- | --- | --- | --- |
| Item | .42 | .31 | .21 | 10 |
| Weight Day 1 | 1019 | 1018 | 1018 | 1017 |
| Weight Day 56 | 1229 ab | 1205 a | 1244 b | 1241 b |
| ADG | 3.83 ab | 3.40 a | 4.11 b | 4.05 b |
| DMI | 19.9 ab | 19.2 a | 20.5 bc | 20.9 C |
| Conversion | 5.20 ab | 5.65 b | 4.99 a | 5.16 a |
| MBI | 8.7 | 8.0 | 9.4 | 10.8 |

As the level of fish oil was decreased in rations with 0.38% $CaCl_2$, the intake and the corresponding performance increased. The highest intake and gain was observed with fish oil levels less than 0.21%.

Example 3-Evaluation of Different Levels of $CaCl_2$ with Lower Levels of Fish Oil 64 steers were evaluated with the average steer weight of 700 pounds. The LR ration was supplemented with 0.39% AS and 0.42% FO (LR-C). LR rations were supplemented with 0.10% FO with 0.13%, 0.38% and 0.62% $CaCl_2$ on a dry matter basis and compared to LR-C. The results from this study are shown in Table 3.

TABLE 3

| Item | FO $CaCl_2$ | 42 (LR-C) 0 | .10 .13 | .10 .38 | .10 .62 |
| --- | --- | --- | --- | --- | --- |
| IWT | | 660 | 661 | 660 | 660 |
| FWT | | 1239ab | 1276b | 1221a | 1206a |
| ADG | | 4.37ab | 4.65b | 4.23a | 4.12a |
| DMI 1-60 | | 16.4 | 17.1 | 16.4 | 16.1 |
| DMI 61-133 | | 18.8 | 20.3 | 18.2 | 19.0 |
| DMI 1-133 | | 17.7 | 18.8 | 17.4 | 17.7 |
| DMConv | | 4.05a | 4.04a | 4.11ab | 4.30b |
| MBI | | 17.9 ab | 24.3b | 15.9 ab | 12.3 a |

The highest intake was observed with the lowest level of $CaCl_2$ (0.13%). As the level of $CaCl_2$ increased to 0.38% and 0.62%, intakes were similar to the LR-C but gains were reduced. The diet with $CaCl_2$ at 0.62% had the poorest gains and poorest conversions.

Example 4-Evaluation of the Use of $CaCl_2$ as Modifier without FO

The LR ration was supplemented with 0.39% AS and 0.42% FO (LR-D). Test rations contained LR-ration supplemented with 0.39% AS and 0.34% $CaCl_2$ and no FO. The results are shown below in Table 4.

TABLE 4

|  | LR-D | 0.34% $CaCl_2$ |
|---|---|---|
| IWT | 729 | 730 |
| FWT | 1240 | 1256 |
| DOF (days on feed) | 124 | 124 |
| ADG | 4.07 | 4.20 |
| DMI | 17.3 | 17.7 |
| Conversion | 4.25 | 4.21 |
| MBI | 20.5 | 11.0 |

Replacement of the FO with 0.34% $CaCl_2$ improved performance as seen with comparison to LR-D.

Example 5-Evaluation and Performance with Increasing Levels of AS and 0.3% $CaCl_2$ 120 steers with an average weight of 600 pounds were evaluated. LR-ration with $CaCl_2$ (as a dry matter basis) and no AS (LR-E) was compared to test rations containing 0.30%, and 0.45% AS along with 0.3% $CaCl_2$. The data from this study is shown in Table 5.

TABLE 5

|  | LR-E | 0.3$CaCl_2$ + 0.15 AS | 0.3$CaCl_2$ + .30 AS | 0.3$CaCl_2$ + .45 AS |
|---|---|---|---|---|
| In Weight | 596 | 598 | 598 | 598 |
| Final Weight | 1241 | 1244 | 1247 | 1243 |
| ADG | 3.54 | 3.54 | 3.56 | 3.53 |
| Intake | 21.2 | 20.4 | 20.9 | 20.6 |
| Conv. | 6.01 | 5.77 | 5.88 | 5.82 |

The steers treated with Ammonium sulfate tended to have lower intakes and improved feed conversion compared to LR-E.

Example 6-Effect of $CaCl_2$ on Eating Behavior of Steers Fed LR Ration 16 steers with an average weight of 1175 were evaluated. The LR-ration was modified with 0.39% AS, 0.2% DAP and 0.21% FO (LR-F). Test rations had 0.35% $CaCl_{21}$ with AS or only 0.35% $CaCl_2$. The results are shown in Table 6.

TABLE 6

|  | LR-F | $CaCl_2$ | $CaCl_2$ + AS |
|---|---|---|---|
| Intake, lbs/day | 24.7 | 24.9 | 24.3 |
| Meals/Day | 8.99 | 10.14 | 9.66 |
| Intake/Meal | 3.01 | 2.60 | 2.74 |
| Average Largest Meal, lbs | 8.45 | 7.97 | 7.87 |
| Minutes/Day | 147 | 163 | 156 |

$CaCl_2$ = .35% dry matter basis
$CaCl_2$ + AS = .35% dry matter basis $CaCl_2$ and .39% ammonium sulfate The use of 0.35% $CaCl_2$ as the sole modifier resulted in similar intakes, more meals, less feed/meal and a slight reduction in the largest meal compared to LR-F. Addition of 0.39% of AS to the 0.35% $CaCl_2$ resulted in a slight decrease in intake with an intermediate response in eating behavior.

Example 7-Determination of the Effective Range of Inclusion for $CaCl_2$

A conventional ration (8% roughage) and LR-G (2% roughage with 0.39% AS, DAP and 0.21% FO) were compared to test diets that contained LR ration (2% roughage) with 0.1%, 0.2%, 0.3% and 0.4% $CaCl_2$. The results of these comparisons are shown in Table 7.

TABLE 7

|  | Conventional | LR-G | .1 $CaCl_2$ | .2 $CaCl_2$ | .3 $CaCl_2$ | .4 $CaCl_2$ |
|---|---|---|---|---|---|---|
| In Weight | 882 | 883 | 884 | 883 | 883 | 884 |
| Final Weight | 1330 | 1342 | 1327 | 1344 | 1335 | 1320 |
| ADG | 4.08 | 4.22 | 4.05 | 4.19 | 4.14 | 4.00 |
| Intake | 25.9 | 25.5 | 25.1 | 25.4 | 25.8 | 24.3 |
| Conv. | 6.52 b | 6.10 ab | 6.28 b | 6.11 ab | 6.31 b | 6.23 av |
| MBI | 40.0 c | 25.6 ab | 19.1 ab | 22.8 ab | 29.3 bc | 25.6 ab |

All of the diets had improved feed conversion compared to the conventional ration. The use of $CaCl_2$ at more than 0.3% or less than 0.2% resulted in intakes and performance that was poorer than conventional or LR-G ration. The addition of 0.2 to 0.3% of $CaCl_2$ resulted in intake and gain performance similar to conventional ration and LR-G ration and conversions similar to LR-G. LR rations with only $CaCl_2$ may be advantageous because of the lower expense relative to rations that use fish oil, ammonium sulfate, and/or diammonium phosphate.

Example 8-Evaluation of 0.25% $CaCl_2$

A conventional diet having 8% roughage was compared to a LR-ration with 2% roughage and 0.25% $CaCl_2$ (LR-H). The results are shown in Table 8.

TABLE 8

|  | Conventional | LR-H .25% $CaCl_2$ |
|---|---|---|
| In Weight | 700 | 703 |
| Final Weight | 1261 | 1273 |

TABLE 8-continued

|  | Conventional | LR-H .25% CaCl$_2$ |
|---|---|---|
| Days on Feed | 148 | 148 |
| ADG | 3.81 | 3.89 |
| Feed intake | 22.8 | 22.4 |
| Conversion | 6.03 | 5.79 |

The ration with 0.25% CaCl$_2$ had an improved ADG and conversion. These results show that using the lower 2% roughage ration with 0.25% CaCl$_2$, the animals' gain improved compared to the conventional ration, while still promoting enhanced feed convers 10n.

Example 9-Comparison of Conventional Ration Compared to Low Roughage Ration

A conventional diet having 8% roughage was compared to a LR-ration with 0% roughage. The results are shown in Table 9.

TABLE 9

|  | Conventional | LR ration |
|---|---|---|
| Intake, lbs/day | 21.3 | 18.3 |
| Meals/day | 7.6 | 8.6 |
| Intake/meal | 3.1 | 2.4 |
| Average largest meal, lbs | 6.0 | 4.8 |
| Minutes/day | 111.6 | 93.8 |

The results show that LR-rations reduce the intake per day and increase the number of meals per day. The amount of intake per meal is also increased.

Although the present invention has been described with reference to preferred embodiments, workers skilled in the art will recognize that changes may be made in form and detail without departing from the spirit and scope of the invention.

What is claimed is:

1. A method of lowering feed conversion values of confined steers comprising:
   feeding the steers a low roughage total daily feed ration comprising calcium chloride at about 0.15 weight percent to about 0.40 weight percent on a dry matter basis,
   wherein in response to ingesting the total daily feed ration, the steers feed more times per day compared to steers fed a conventional daily ration and at least maintain average daily gain, thereby lowering feed conversion values.

2. The method of claim 1, wherein the calcium chloride is between about 0.2 weight percent and about 0.3 weight percent on a dry matter basis.

3. The method of claim 1, wherein the total daily feed ration further comprises fish oil.

4. The method of claim 3, wherein the fish oil is less than about 0.5 weight percent on a dry matter basis.

5. The method of claim 1, wherein the total daily feed ration further comprises diammonium phosphate.

6. The method of claim 5, wherein the diammonium phosphate is less than about 0.25 weight percent on a dry matter basis.

7. The method of claim 1, wherein the total daily feed ration further comprises ammonium sulfate.

8. The method of claim 7, wherein the ammonium sulfate is less than about 0.45 weight percent on a dry matter basis.

9. The method of claim 1, wherein the roughage is up to about 5 weight percent on a dry matter basis.

10. The method of claim 1, wherein the roughage is about 2 weight percent to about 5 weight percent on a dry matter basis.

11. A method of lowering feed conversion values of confined steers, the method comprising:
    providing the confined steers access to a total feed ad libitum, the total feed comprising:
    a no or low roughage feed; and
    calcium chloride at about 0.15 weight percent to about 0.40 weight percent of the total feed on a dry matter basis,
    wherein in response to ingesting the total feed, the steers consume less feed per feeding compared to steers fed a conventional total feed and at least maintain average daily gain, thereby lowering feed conversion values.

12. The method of claim 11, wherein the calcium chloride is between about 0.2 weight percent and about 0.3 weight percent on a dry matter basis.

13. The method of claim 11, wherein the feed further comprises fish oil.

14. The method of claim 13, wherein the fish oil is less than about 0.5 weight percent on a dry matter basis.

15. The method of claim 11, wherein the feed further comprises diammonium phosphate.

16. The method of claim 15, wherein the diammonium phosphate is less than about 0.25 weight percent on a dry matter basis.

17. The method of claim 11, wherein the feed further comprises ammonium sulfate.

18. The method of claim 17, wherein the ammonium sulfate is less than about 0.45 weight percent on a dry matter basis.

19. The method of claim 11, wherein the roughage is up to about 5 weight percent on a dry matter basis.

20. The method of claim 11, wherein the roughage is about 2 weight percent to about 5 weight percent by weight on a dry matter basis.

* * * * *